(12) United States Patent
Steakley

(10) Patent No.: US 8,732,238 B2
(45) Date of Patent: May 20, 2014

(54) INSTALLING APPLICATIONS BASED ON A SEED APPLICATION FROM A SEPARATE DEVICE

(71) Applicant: Apple Inc., Cupertino, CA (US)

(72) Inventor: Edward D. Steakley, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/692,403

(22) Filed: Dec. 3, 2012

(65) Prior Publication Data

US 2013/0124619 A1    May 16, 2013

Related U.S. Application Data

(63) Continuation of application No. 12/483,164, filed on Jun. 11, 2009, now Pat. No. 8,346,847.

(60) Provisional application No. 61/183,861, filed on Jun. 3, 2009.

(51) Int. Cl.
*G06F 15/16*    (2006.01)

(52) U.S. Cl.
USPC .......................... 709/203; 709/200; 709/202

(58) Field of Classification Search
USPC ........................................ 709/200, 202, 203
See application file for complete search history.

(56) References Cited

U.S. PATENT DOCUMENTS

| | | | |
|---|---|---|---|
| 6,701,521 B1 * | 3/2004 | McLlroy et al. | 717/173 |
| 6,832,242 B2 * | 12/2004 | Keskar | 709/204 |
| 7,127,429 B2 | 10/2006 | Kang | |
| 7,289,964 B1 * | 10/2007 | Bowman-Amuah | 705/1.1 |
| 7,509,372 B2 * | 3/2009 | Dutta et al. | 709/203 |
| 7,529,723 B2 * | 5/2009 | Howard et al. | 1/1 |
| 7,616,131 B2 * | 11/2009 | Mathews et al. | 340/989 |
| 7,844,287 B2 * | 11/2010 | Bengtsson et al. | 455/466 |
| 7,849,135 B2 * | 12/2010 | Agrawal et al. | 709/204 |

(Continued)

FOREIGN PATENT DOCUMENTS

| | | |
|---|---|---|
| CN | 1722128 | 1/2006 |
| GB | 2431831 A | 5/2007 |

(Continued)

OTHER PUBLICATIONS

Australian Application No. 2010257023—Patent Examination Report No. 2 dated May 3, 2013.

(Continued)

*Primary Examiner* — Anthony Mejia
(74) *Attorney, Agent, or Firm* — Womble Carlyle Sandridge & Rice

(57) ABSTRACT

Disclosed herein are systems, computer-implemented methods, and tangible computer-readable storage media for synchronizing applications between devices. The method displays, on a sharing device, a list of one or more applications which are available to share with other devices, and receives a selection, at the sharing device, of an application to share with a receiving device from the list of applications. The method then determines by the sharing device, sharing preferences of the selected application, creates an application package at the sharing device, based on the sharing preferences, and establishes a network connection from the sharing device to the receiving device. The system transmits the application package from the sharing device to the receiving device via the network connection.

22 Claims, 9 Drawing Sheets

(56) References Cited

U.S. PATENT DOCUMENTS

| | | | |
|---|---|---|---|
| 8,020,158 B2* | 9/2011 | Xie et al. | 717/171 |
| 8,255,871 B1* | 8/2012 | Kompella et al. | 717/108 |
| 2003/0073432 A1* | 4/2003 | Meade, II | 455/420 |
| 2003/0222913 A1 | 12/2003 | Mattila et al. | |
| 2004/0044727 A1* | 3/2004 | Abdelaziz et al. | 709/203 |
| 2005/0097006 A1 | 5/2005 | Nyako | |
| 2005/0216548 A1 | 9/2005 | Wormington et al. | |
| 2006/0035655 A1* | 2/2006 | Lonnfors et al. | 455/517 |
| 2006/0048141 A1 | 3/2006 | Persson et al. | |
| 2006/0148512 A1* | 7/2006 | Ekholm et al. | 455/550.1 |
| 2006/0206882 A1* | 9/2006 | Illowsky et al. | 717/144 |
| 2007/0129014 A1* | 6/2007 | Bertorello et al. | 455/41.2 |
| 2007/0130541 A1* | 6/2007 | Louch et al. | 715/804 |
| 2007/0143446 A1* | 6/2007 | Morris | 709/219 |
| 2007/0233782 A1 | 10/2007 | Tali | |
| 2007/0279379 A1* | 12/2007 | Stefanik et al. | 345/156 |
| 2008/0052348 A1 | 2/2008 | Adler et al. | |
| 2008/0141244 A1 | 6/2008 | Kelley | |
| 2008/0274716 A1* | 11/2008 | Fok et al. | 455/410 |
| 2009/0094339 A1* | 4/2009 | Allen et al. | 709/206 |
| 2009/0228868 A1* | 9/2009 | Drukman et al. | 717/121 |
| 2009/0254459 A1* | 10/2009 | Williams et al. | 705/27 |
| 2010/0228836 A1* | 9/2010 | Lehtovirta et al. | 709/220 |
| 2010/0257251 A1* | 10/2010 | Mooring et al. | 709/216 |
| 2010/0261488 A1* | 10/2010 | Little et al. | 455/466 |
| 2010/0262925 A1* | 10/2010 | Liu et al. | 715/759 |
| 2011/0047597 A1* | 2/2011 | Mahaffey et al. | 726/3 |

FOREIGN PATENT DOCUMENTS

| | | |
|---|---|---|
| JP | 09-050410 A | 2/1997 |
| JP | 2001-216150 A | 8/2001 |
| JP | 2002-163571 A | 6/2002 |
| JP | 2006-295650 A | 10/2006 |
| JP | 2007-537554 A | 12/2007 |
| WO | 00/36503 A2 | 6/2000 |
| WO | 2004070589 A1 | 8/2004 |
| WO | 2007131540 A1 | 11/2007 |
| WO | 2009109980 A2 | 9/2009 |

OTHER PUBLICATIONS

Korean Application No. 10-2012-7000040—Notice of Preliminary Rejection dated May 13, 2013.

JP Office Action, Application No. 2012-513968 dated Jun. 3, 2013.

"Special Topic I: Is it true that the management cost is zero?", Systems Management Server, net PC, Japan, Ascii K. K., Feb. 1, 1998, vol. 3, No. 2 (the 22nd issue), pp. 58-60.

Hoshino, Yuichi, "What is optimum? No. 25 Verification of application management", LAN Times, Japan, Softbank K. K., Mar. 1, 1998, vol. 8, No. 3 (the 77th issue), pp. 186-187.

Chinese Application for Invention No. 201080029179.3—First Office Action dated Nov. 14, 2013.

* cited by examiner

US 8,732,238 B2

INSTALLING APPLICATIONS BASED ON A SEED APPLICATION FROM A SEPARATE DEVICE

RELATED APPLICATION

The present application is a continuation U.S. patent application Ser. No. 12/483,164, filed on Jun. 11, 2009, which claims priority to U.S. Provisional Patent Application No. 61/183,861, filed on Jun. 3, 2009, both of which are hereby incorporated by reference.

BACKGROUND

1. Technical Field

The present application relates to sharing software applications between devices and more specifically to sharing software applications between devices using a seed application.

2. Introduction

An increasing number of people use mobile computing devices such as smart phones, netbooks, and personal digital assistants (PDAs) in every-day life. Often these mobile computing devices interface with online electronic stores to download applications. In some cases, dedicated online stores exist that cater to specific device types. As users of mobile devices go about their daily activities and use their mobile devices, they can show applications to others. As others see the application, they often desire the same application, but getting that application can involve many steps which may cause the user to not retrieve the application.

For example, Aaron, a smartphone user, is at lunch with his friend Brent. After lunch, when the bill comes. Aaron demonstrates a specialized calculator application on his smartphone to Brent which determines an appropriate tip and how much of the lunch bill they each owe. Brent is very impressed with the calculator application and would like to obtain a copy for his smartphone. In this case, Brent must ask Aaron the name of the application, browse to the online store on the mobile device, search the online store or elsewhere for the application, and finally select and download the application. A simple error in transcribing the name of the application, forgetting about the application, or any of a myriad of other setbacks can interrupt this chain of actions which Brent must accomplish to obtain a copy of the calculator application. Further, Brent can have other availability, licensing, or other feature-related questions to which Aaron does not know the answers. Brent can encounter some difficulty obtaining that information or downloading the application.

Both Brent and the vendor of the calculator application are willing to transact business together, but due to logistical barriers and/or inconvenience they may be unable. Accordingly, what is needed in the art is an improved way to quickly and easily share applications between nearby computing devices.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, computer-implemented methods, and tangible computer-readable storage media for community-based ranking in an electronic store, Each system, computer-implemented method, and tangible computer-readable storage medium can be implemented in other claimable embodiments within the spirit and scope of the disclosure.

One exemplary method synchronizes an application from a sharing device to a receiving device. This method displays, on a sharing device, a list of one or more applications which are available to share with other devices, receives a selection, at the sharing device, of an application to share with a receiving device from the list of applications, determines by the sharing device, sharing preferences of the selected application, creates an application package at the sharing device, based on the sharing preferences, establishes a network connection from the sharing device to the receiving device, and transmits the application package from the sharing device to the receiving device via the network connection.

One exemplary device embodiment synchronizes an application to another device. This device includes a processor, a module configured to control the processor to display a list of applications on a sharing device which are available to share with other devices, a module configured to control the processor to select an application to share with a receiving device from the list of applications, a module configured to control the processor to retrieve sharing preferences from the selected application, a module configured to control the processor to create an application package based on the retrieved preferences that includes metadata associated with the selected application and a unique identifier associated with the sharing device, wherein the sharing preferences determine whether the application package further includes one of a full copy of the application, a limited shared copy of the application, or an application seed uniquely identifying the selected application on a server, a module configured to control the processor to establish a peer-to-peer connection between the sharing device and a receiving device, and a module configured to control the processor to transmit the application package to the receiving device via the peer-to-peer connection.

Another exemplary computer-implemented method receives an application from a sharing device. This method establishes a peer-to-peer connection with a sharing device, receives an application package for a selected application from the sharing device via the peer-to-peer connection, wherein the application package comprises metadata associated with the selected application, the metadata comprising an application identifier, and retrieves a copy of the application from an application distribution server based on the application identifier. If the application package includes the limited shared copy of the application, the method retrieves from the server an upgrade to the limited shared copy of the application. If the application package includes a full copy of the application, the method retrieves from the server additional services or software based on the application package.

One exemplary system tracks shared applications. This system includes a processor, a module configured to control the processor to receive a dataset representing a successful sharing of an application from a sharer to a receiver, the dataset indicating the sharer, the receiver, and the shared application, a module configured to control the processor to insert the received dataset into a first database linking the sharer with the receiver, a module configured to control the processor to insert the received dataset into a second database linking the sharer with the shared application, and a module configured to display at least part of the first or second database.

One exemplary tangible computer-readable storage medium storing a computer program has instructions for receiving an application from another device. The instructions include establishing a peer-to-peer connection with a sharing device, receiving an application package of an application from the sharing device via the peer-to-peer connection, the application package comprising metadata associated with a selected application, a unique identifier associated with the sharing device, and, based on sharing preferences within the application, one of a limited shared copy of the application and an application seed uniquely identifying the selected application on a server, if the application package comprises the application seed, retrieving a copy of the application from the server using the application seed, and if the application package comprises the limited shared copy of the application, retrieving from the server an upgrade to the limited shared copy of the application. if the application package includes the application seed, retrieving a copy of the application from the server using the application seed. If the application package includes the limited shared copy of the application, retrieving from the server an upgrade to the limited shared copy of the application. The tangible computer-readable storage medium can include RAM, ROM, hard drive, solid-state memory, and other storage media on the client and/or the server.

Another exemplary method embodiment distributes from an application distribution server one or more applications to a receiving device. This method receives an application download request from a receiving device, wherein the download request comprises a device ID or user account of a sharing device, and an application identifier, and transmits to the receiving device a copy of the requested application based on the application identifier.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure.

Figure 1:
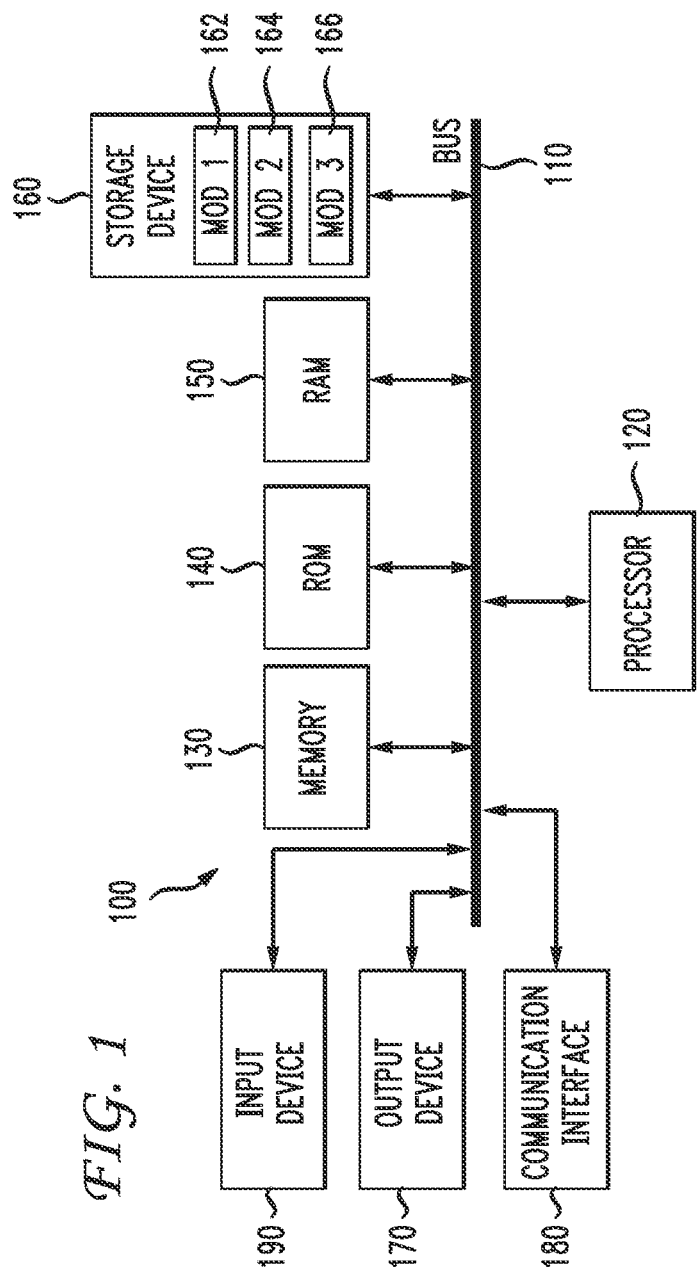
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 can be available for use as well. It can be appreciated that the disclosure can operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 can essentially be a completely self-contained computing system, containing multiple cores or processors, a bus, memory controller, cache, etc. A multi-core processor can be symmetric or asymmetric.

The system bus 110 can be any of several types of bus structures including a memory bus or memory controller, a peripheral bus, and a local bus using any of a variety of bus architectures. A basic input/output (BIOS) stored in ROM 140 or the like, can provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, can also be used in the exemplary operating environment. Tangible computer-readable storage media expressly exclude media such as energy, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 can be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here can easily be substituted for improved hardware or firmware arrangements as they are developed.

For clarity of explanation, the illustrative system embodiment is presented as including individual functional blocks including functional blocks labeled as a "processor" or processor 120. The functions these blocks represent can be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 can be provided by a single shared processor or multiple processors. (Use of the term "processor" should not be construed to refer exclusively to hardware capable of executing software.) Illustrative embodiments can include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination, with a general purpose DSP circuit, can also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are configured to control the processor 120. These modules can be stored on the storage device 160 and loaded into RAM 150 or memory 130 at runtime or can be stored as would be known in the art in other computer-readable memory locations.

Having disclosed some fundamental system components, the disclosure turns to a more detailed description of the method and other embodiments. For clarity, the methods are discussed in terms of a system configured to practice the method, such as the system 100 shown in FIG. 1. The following examples are illustrative and should not be considered limiting as the principles described can be incorporated in other embodiments and configurations. A processor can perform any of the steps in the methods.

Figure 2:
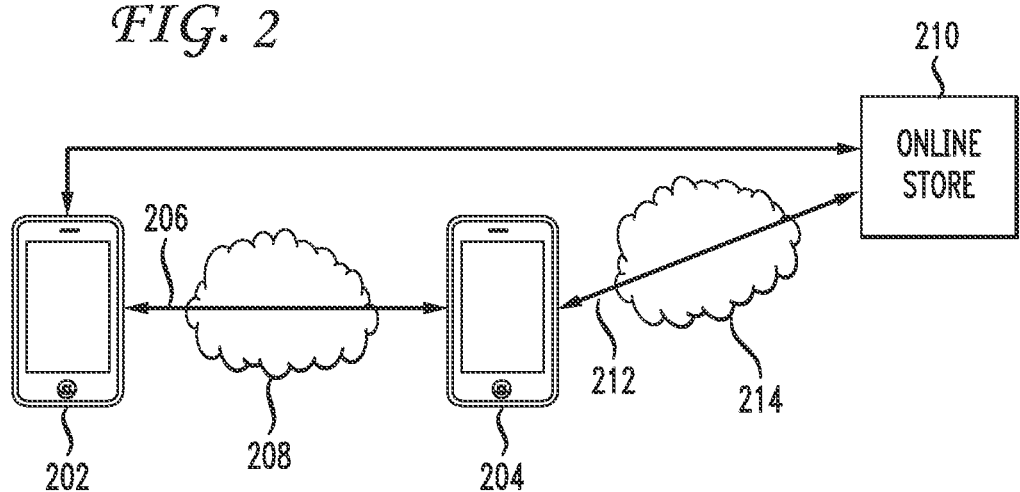
FIG. 2 illustrates a sample sharing device, receiving device, and server.

FIG. 2 illustrates a sample sharing device, receiving device, and server. Each of these devices can be a computing device essentially as shown in FIG. 1. The devices can be smart phones, cellular phones, personal digital assistants (PDAs), laptops, media players, global positioning system (GPS) devices, laptops, and other mobile or non-mobile computing devices, In the example in the background section, Aaron wishes to share an application from his smart phone with Brent's smart phone. in this example, both Aaron's and Brent's devices are smart phones. But in implementation, one device can be a smart phone and another can be a personal computer, for example. In another implementation, a fixed-location sharing device is incorporated into a wireless access point in a cafe so cafe customers can share applications from their mobile devices to the wireless access point which in turn can share the application with future customers after the original mobile device leaves. A peer to peer network can include a homogeneous and/or heterogeneous mixture of devices.

The disclosure now returns to Aaron and Brent. Aaron wants to share an application stored on his sharing device 202 with Brent's receiving device 204. Aaron's device 202 displays a list of applications which are available to share with Brent. Aaron selects, via a suitable user input such as speech, touch gestures, stylus input, keypad input, etc., at east one application to share with Brent's device 204.

After Aaron selects the application to share, Aaron's device 202 retrieves sharing preferences from the selected application. If the selected application does not include any specified sharing preferences, the device can select or generate a default preference, such as a preference to not share the application. The application can have preferences that allow sharing fully functional copies of the application. In other cases, the application preferences allow sharing only a limited functionality demo copy, a fully functional copy that expires after a certain period of time, or an application seed that uniquely identifies the application on a server 210. Aaron's device 202 creates an application package to transfer to Brent's device 204 that has an identifier associated with Aaron's device or user account and an identifier associated with Brent's device or user account. The application package can also include application metadata such as an application icon, a full copy of the application, a limited copy of the application, and/or an application seed. In one aspect, the application package also includes settings, history, and/or preferences for the application, too. Such settings can optionally be included in part or in whole.

The two devices 202, 204 establish a peer-to-peer connection 206 directly with each other, such as a cable or an infrared connection, or through a network cloud 20$, such as the Internet, a cellular network, or a wireless mesh network. Brent's device 204 can transmit to Aaron's device 202 an acknowledgement of successful receipt of the application package. In case the transfer is incomplete, Aaron's device 202 can transmit the application seed first, so that even if the entire application doesn't transmit successfully, Brent's device 204 has enough information, i.e. the application seed, to download the application from the server and can proceed with only that information. A graphic image may be provided with the application seed, so that the receiving device can display a visual representation of the application. In one aspect, the receiving device displays an initial portion of the graphic image provided with the application seed and progressively increases the displayed portion in order to reflect the increasing completeness of the received application package.

Aaron's device 202 and/or Brent's device 204 can report the successful sharing transaction to the server 210. The server 210 can keep records of each sharing transaction and can prepare in advance a copy of the application for Brent's device 204 to download.

If the application package includes a full copy of the application, then Brent's device 204 now has the application and does not necessarily need to perform any additional steps. However, if the application package includes a limited functionality copy of the application, then Brent's device 204 can establish a connection 212 with a server 210 directly or through a network cloud 214. The server 210 can provide additional information regarding the application and allow Brent to purchase, retrieve, or download the shared application by unlocking at least a portion of the limited functionality or downloading a new copy of the shared application from the server. If the application package includes an application seed, Brent's device 204 connects to the server 210 and uses the application seed to retrieve the shared application. For example, the application seed can be an XML file, a semi-meaningful text string such as "Seed.App.2B700A9D", a number, or a randomly assigned. string of characters. When multiple servers are available, the seed can also include a reference to a preferred server from which to obtain the application. In some cases, a single piece of data incorporates the application seed and the two identifiers. The server 210 can perform security or verification checks to ensure that the correct device is requesting the application, for example. The server 210 can modify the requested application such that it is only functional on the target device, Brent's device 204 in this case. The server 210 can be an online store or a software publisher's website, for example.

When Brent retrieves a full version of a shared application Aaron shared with Brent, the server 210 can provide some sort of incentive to Aaron. The incentive can be money, store credit, coupons, promotional items (real or digital), an improved status, and others. The server, the sharing device, or the receiving device can also track a sharing history of sharer-receiver pairs which can even be traceable back to the original source of the application. Many other variations for displaying and tracking sharing information are contemplated.

Figure 3:
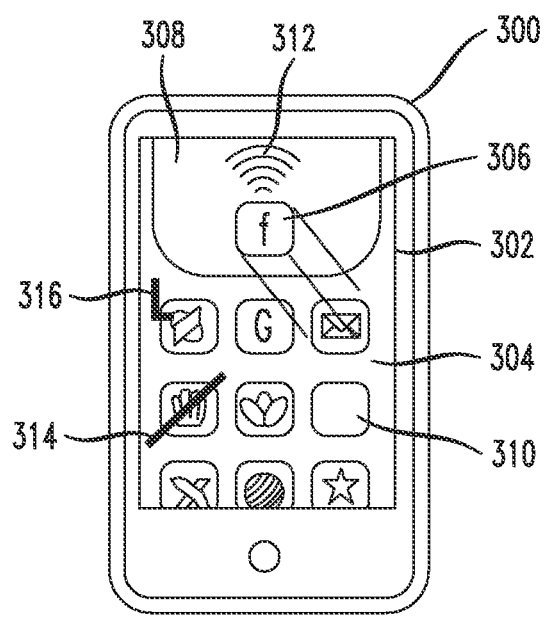
FIG. 3 illustrates an example user interface on a sharing device.

FIG. 3 illustrates an example user interface on a sharing device 300 belonging to Aaron. The sharing device 300 includes a display 302 which can be any shape, aspect, or size. The device 300 shows Aaron a list of application icons 304 on the device 300. Aaron can move the application icon representing the application he wants to share 306 into a designated area 308. Aaron can use a stylus, a touch gesture, a keyboard, buttons, speech, or other user inputs to move the application icon. After Aaron moves the application icon, the device can, as an example, remove, the application icon 306 from the list, make the application icon blank 310 in the list, or dim or gray out the application icon 310 in the list. Aaron can similarly move more than one application icon into the designated area 308. When Aaron is ready to transmit these applications, he selects a send button 312 or provides other suitable user input. The device prepares the application package for each application based on intelligence, preferences, or code found in the respective applications. The device then transmits the application package(s) to a receiving device. In one aspect, the sharing device visually represents movement of the selected application icon to a representation of the second device, such as a small device icon through an animation or other suitable visual., audible, audiovisual, vibration-based, or other type of cue.

In one embodiment, the device displays icons or notifications that certain applications will be shared differently. For example, one application icon 314 is crossed out, indicating that it can not be shared at all. Another example is the application icon 316 with an overlaid letter "L", indicating that it can be shared only with limited functionality. A software developer can mark published application as "unsharable" unconditionally or only under certain circumstances. Certain expensive or highly sensitive applications such as a medical records database application) can include flags indicating that they cannot be shared.

The application on the sharing device may have been previously configured with share criteria as discussed above. The application developer when creating the application may identify whether the application may be shared. A share flag, or share code, may be embedded in the application such that the sharing device looks to this share flag to determine whether and how the application may be shared with another device. The application may utilize a hash function or some other security measure so that if the flag is modified in the application on the sharing, the application will not operate, the application will default to a no share mode, or the application will perform some oilier action established by the application developer or another entity. This approach can prevent and/or discourage modification of the share flag in the application on the sharing device to prevent unauthorized application sharing.

In one embodiment, if the application is transferred to the receiving device, the receiving device allows operation of the shared application depending on the share flag. For example, if the share flag indicates full functionality, then the sharing device activates the application with full functionality. If the share flag is set to limited functionality, then the receiving device activates a limited set of functionality. Furthermore, a share period may have been previously set in the application. The share period may be configured as a set period of time such as a number of hours, days, weeks, months, or a combination thereof. Also, the share period can be set as a number of activations for the application on the receiving device. Once the number of activations expires, the receiving device is unable to activate the application. For example, an activation counts when the application on the sharing device is operated. If the application share period expires, the sharing device may provide a display to the user indicating the application is no longer operable or may be used.

Figure 4:
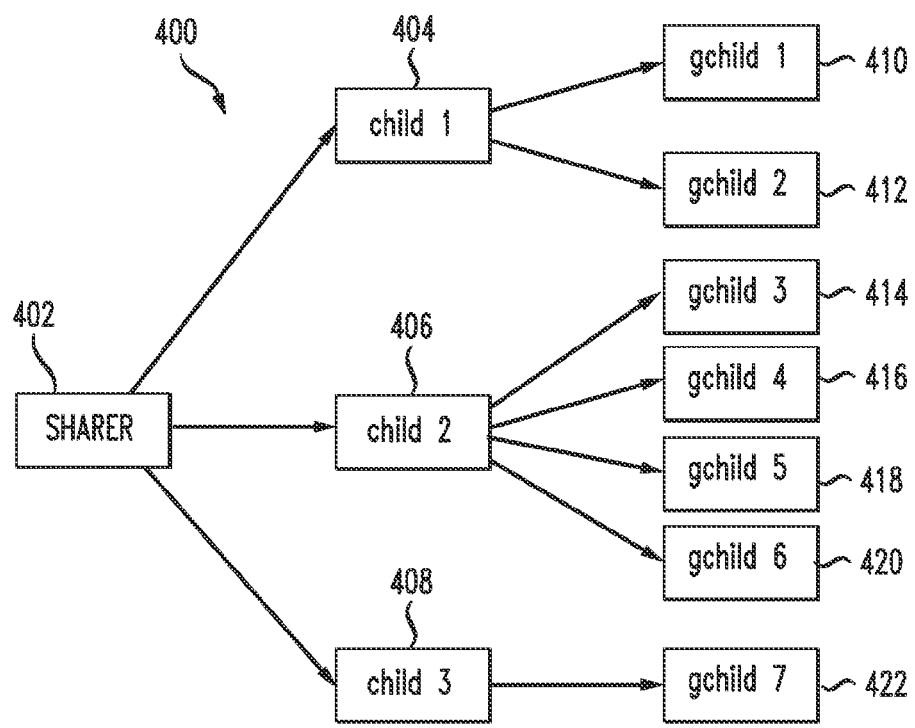
FIG. 4 illustrates a sample tree showing descendants.

The system can use this exemplary interface or any other suitable user interface for a user to share an application. For example, one variation of this interface provides different designated areas for each nearby device. These designated areas can appear or disappear as nearby devices move in and out of a specified range. The designated areas can move around the screen based on the location of the associated nearby device, FIG. 4 illustrates a sample tree 400 showing descendants. These types of tree structures can easily show how an application is shared within a group of users. When Aaron shares the application with Brent, Brent becomes a child of Aaron's in the tree structure. In this example, the Sharer 402 shared the application with child1 404, child2 406, and child3 408. Child1 404 shares with gchild1 410 and gchild2 412. Child2 406 shares with gchild3 414, gchild4 416, gchild5 418, and gchild6 420. Child3 408 shares with gchild7 422. This display can be advantageous when sharers receive some kind of compensation for sharing applications or for people retrieving shared applications. The sharer 402 can examine his children's sharing patterns and target those children who share the application in turn with the most effect. In this case, the sharer 402 can make an effort to share other applications with child2 406 because he shares with many others. A server can store such a tree for advertising or promotional purposes. The server can display all or part of such a tree to sharers and/or receivers. Receivers can be interested to see the sharing path from the original source. It can be a source of prestige to see that the application was shared through a celebrity, for example. In one aspect, a server can display such a tree overlaid on a map with nodes placed on the map to indicate each node's current geographical location.

In another aspect, a server storing a tree of sharing descendants and ancestors can analyze "relatives" in the tree to determine which applications are likely to appeal to a particular user, which she does not already have. For instance, if 5 out of 6 of Brent's nearby "sharing relatives" have Application X, the server can notify Brent of this fact and offer Brent the chance to download and/or purchase Application X. The server can retrieve and display to Brent any reviews or other feedback from the nearby "sharing relatives." This approach can be very successful because Brent should have some level of implicit trust or familiarity with those "sharing relatives."

In other cases, a portion of an application's functionality is initially restricted., locked, or otherwise disabled. One way to unlock this functionality is to share the application with others. For example, a Blackjack card game application can include one unlocked type of cardback. For every 3 people Aaron shares the Blackjack application with, the application unlocks another cardback. When Aaron shares the Blackjack application with Brent, Brent's copy of the application can be reset to only one unlocked type of cardback or it can remain in the same state and keep the same preferences as Aaron's copy.

Figure 5:
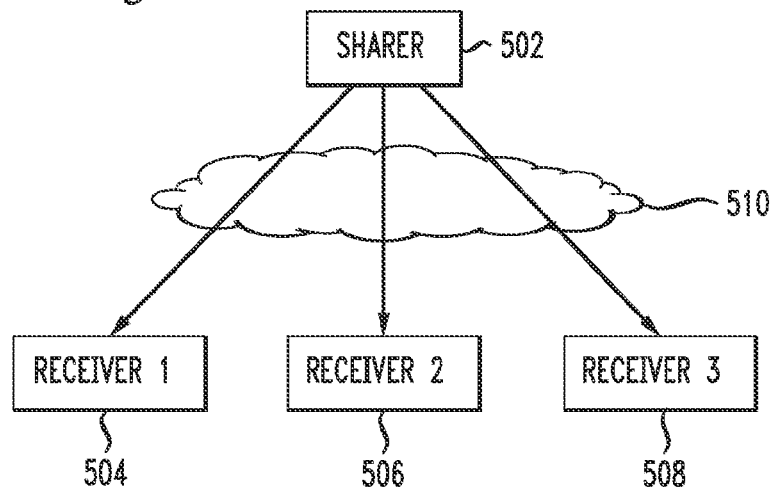
FIG. 5 illustrates an exemplary peer-to-peer network.

FIG. 5 illustrates an exemplary peer-to-peer network. In this case, a sharer 502 establishes a wireless sharing network 510 with receiver 1 504, receiver 2 506, and receiver 3 508. The network connection can be via 802.11x wireless, infrared, Bluetooth, Wireless USB, General Packet Radio Service (GPRS), or other wired or wireless networking protocols and media. In one embodiment, the sharer device 502 initiates the peer-to-peer network 510 when a user wants to share an application. The sharer and/or receiver devices can withdraw from the network before, during, or after transmitting or receiving the application package.

In one embodiment, the sharing, device and the receiving device are the same type of device, although the devices can be of any types capable of intercommunication. In one embodiment, the devices are both cellular phones. As such, the devices are generally connected via a cellular network at all time, but establish a special connection (either through the cellular network or through a second network interface) to one another based on physical proximity. The devices can sense physical proximity based on position sensors, such as a Global Positioning System (GPS) device. In another aspect, a sharing device 502 maintains a persistent peer-to-peer network even when no other peers are nearby. When more than two devices are in the peer-to-peer network and when an application is available from multiple sources in the peer-to-peer network, a sharing device can instruct other devices to transmit portions of the shared application to the receiving device. In this or other ways, multiple sharing devices can provide at least a portion of the shared application to the receiving device. In another aspect, multiple sharing devices and multiple receiving devices interact and share the application with each other.

When other devices enter the peer-to-peer network, they can query the sharing, device 502 for available applications and cache an application package for an available application without any user interaction. In this way, the devices can automatically share applications without user interaction. Later, a user can review cached application packages and decide which ones to keep and which ones to discard. In one aspect, once a user discards a cached application package, when the device encounters that application again, the device does not automatically retrieve it. The receiving device can compare applications available on the sharing device with installed applications and forego downloading application packages already on the receiving device. Further, users can disable automatically receiving or sharing applications from certain individuals, applications of a certain class, at certain times, or in certain places. For example, Brent turns off automatic sharing while riding the subway back to the office from lunch. Aaron, feeling more adventurous, turns automatic sharing on to see what applications his device picks up from others while riding the bus back to the office. While Aaron does not need to turn his device on or interact with it in any way, it caches shared applications from nearby devices. Aaron can review these applications later and keep or download the ones he likes.

Figure 6:
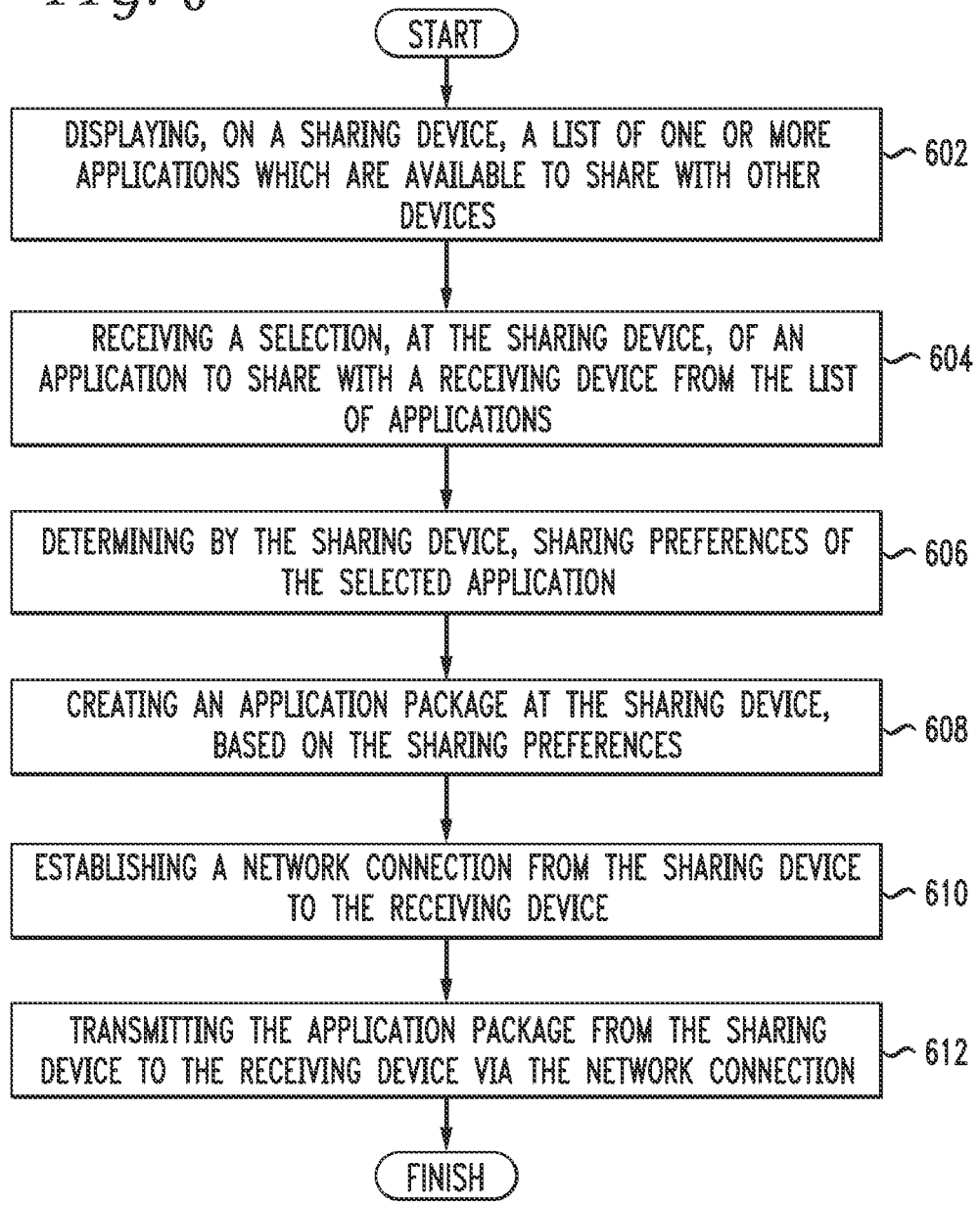
FIG. 6 illustrates a first example method embodiment.

FIG. 6 illustrates a first example method embodiment for synchronizing an application from a sharing device to a receiving device. For clarity, the method is discussed in tent's of a system configured to practice the method. In this example, Aaron's device is the sharing device and Brent's device is the receiving device. The system first displays, on a sharing device, a list of one or more applications which are available to share with other devices (602). The system can filter the list of applications based on one or more criteria, such as screen size, available space on the receiving device, applications already on the receiving device, application preferences, and so forth. Other criteria are contemplated.

The system receives a selection, at the sharing device, of an application to share with a receiving device from the list of applications (604). User input such as a tap on a touch screen or a voice command can indicate the selection. The system can select a group of applications at the same time. In some cases, an application can include more than one sharing approach. For example, a game can include instructions for generating a sharable application package of a demo or a full version. A user at the sharing device can select which version of the application package to generate.

The system determines by the sharing device sharing preferences of the selected application (606). The selected application can include embedded preferences and/or separate configuration files storing sharing preferences. These preferences can be user modifiable or they can be fixed by a software publisher, for example. In one embodiment, the sharing preferences include instructions for how to generate the application package.

The system creates an application package at the sharing device, based on the sharing preferences (608). The system establishes a network connection from the sharing device to the receiving device (610) and transmits the application package from the sharing device to the receiving device via the network connection (612). In one aspect, the sharing device further receives an acknowledgment from the receiving device that the application package transmitted successfully.

In one embodiment, the system transmits to the server information related to transmitting the application package (614), otherwise known as tracking information. The server can compile the tracking information from multiple devices to generate statistics and reports regarding application sharing, distribution, popularity, geographic location, and other metrics. The information transmitted to the server can include the total number of application packages transmitted from the sharing device. This information can help a server calculate a total number of shared applications over a particular population, location, time, or customer segment. For instance, the server can track how many applications are shared on U.C. Berkeley Campus on a monthly basis or how many total applications are shared each day. The information transmitted to the server can be associated with a user account or a with a user device, which indicates how prolific a particular sharer is. For example, the server can track the, number of people with whom Aaron has shared an application. The sharing device can retain and store a copy of the information transmitted to the server. This feature can provide device or user specific statistics as well as serve as a distributed backup of statistical information.

Figure 7:
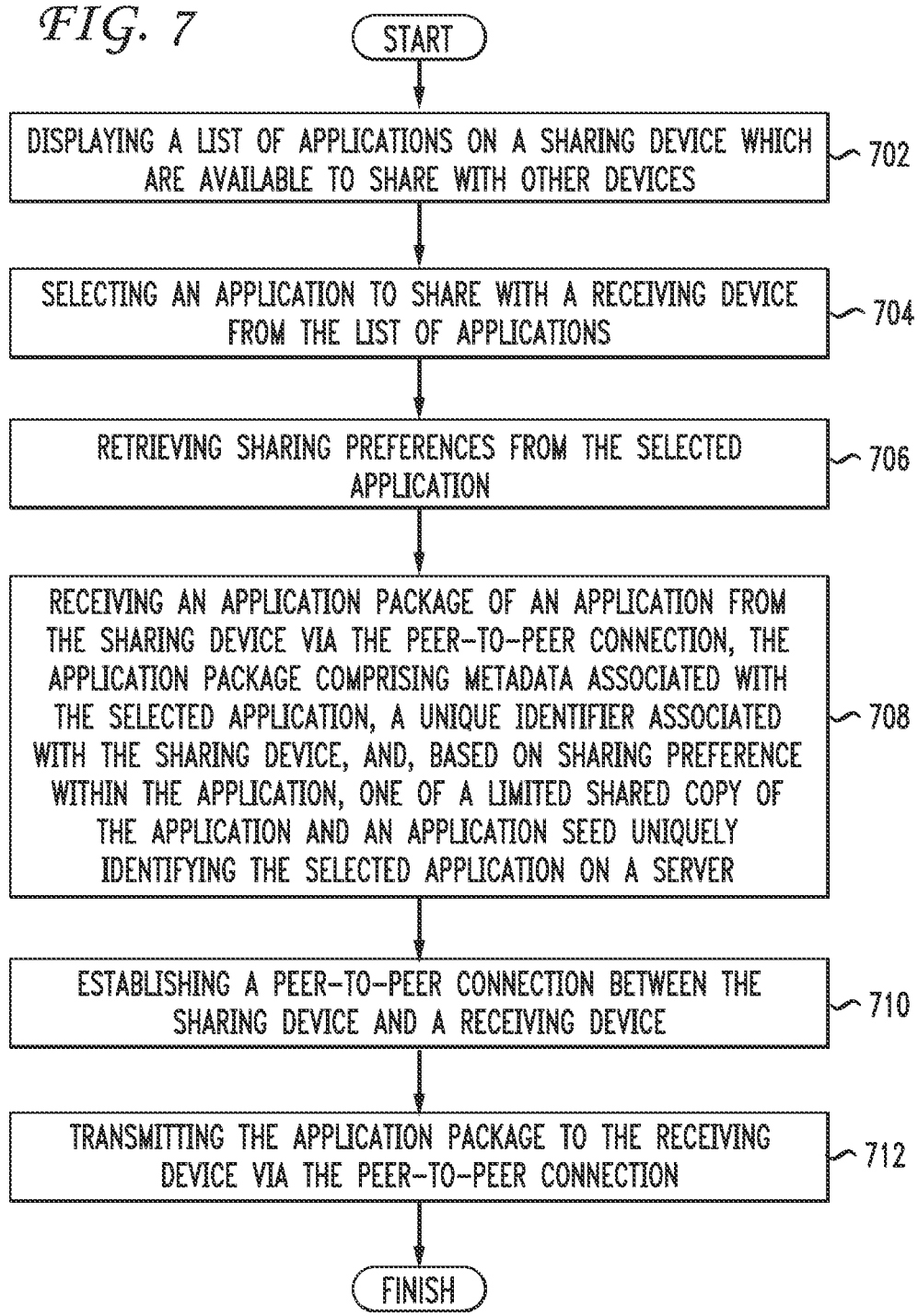
FIG. 7 illustrates a second example device embodiment

FIG. 7 illustrates a second example device embodiment, the device being capable of synchronizing an application to another device. in one aspect, the device includes a processor and modules configured to control the processor to take the following steps, The device first displays a list of applications on a sharing device which are available to share with other devices (702). In one aspect, the device does not display those applications on the sharing device which are already on the receiving device. If application sharing preferences include a flag indicating that the selected application can not be shared, the device can block transmission of the flagged applications.

The device then selects an application to share with a receiving device from the list of applications (704). User input can direct the device to select a particular application. The device then retrieves sharing preferences from the selected application (706) and creates an application package based on the retrieved preferences that includes metadata associated with the selected application and a unique identifier associated with the sharing device, wherein the sharing preferences determine whether the application package further includes one of a full copy of the application, a limited shared copy of the application, or an application seed uniquely identifying the selected application on a server (708). The application package can include a limited shared copy of the application or an application seed and/or instructions for downloading the selected application. Next, the device establishes a peer-to-peer connection between the sharing device and a receiving device (710). In one embodiment, both the sharing device and the receiving device are the same type of device. In another embodiment where the devices are different types, the sharing device can customize the application package based on the receiving device type.

The device then transmits the application package to the receiving device via the peer-to-peer connection (712). In one aspect, the device visually represents "movement" of the selected application to a representation of the second device, represented by the motion shown of icon 306 in FIG. 3. In another aspect, the device further transmits the application to the receiving device only if the selected application contains a flag indicating that the selected application can be shared.

Figure 8:
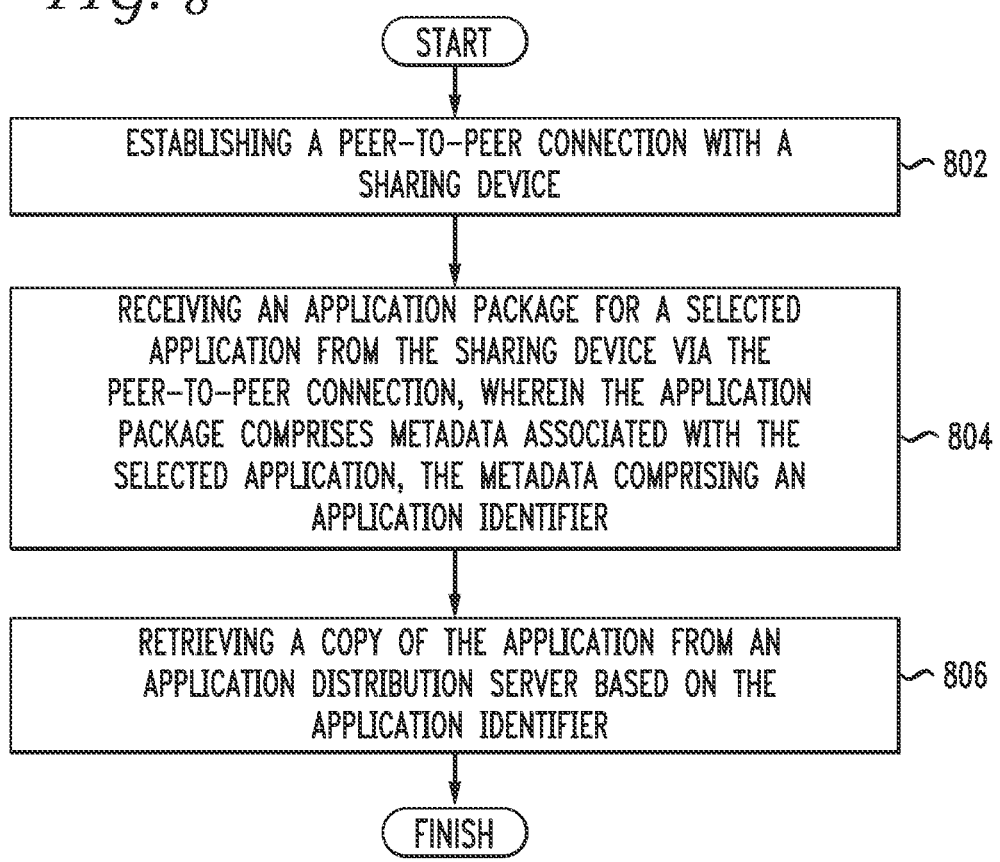
FIG. 8 illustrates a third example method embodiment.

FIG. 8 illustrates a third method embodiment for receiving an application from a sharing device. A system as shown in FIG. 1 can be configured to practice the method. The system establishes a peer-to-peer connection with a sharing device (802) and receives an application package for a selected application from the sharing device via the peer-to-peer connection, wherein the application package comprises metadata associated with the selected application, the metadata comprising an application identifier (804).

Figure 9:
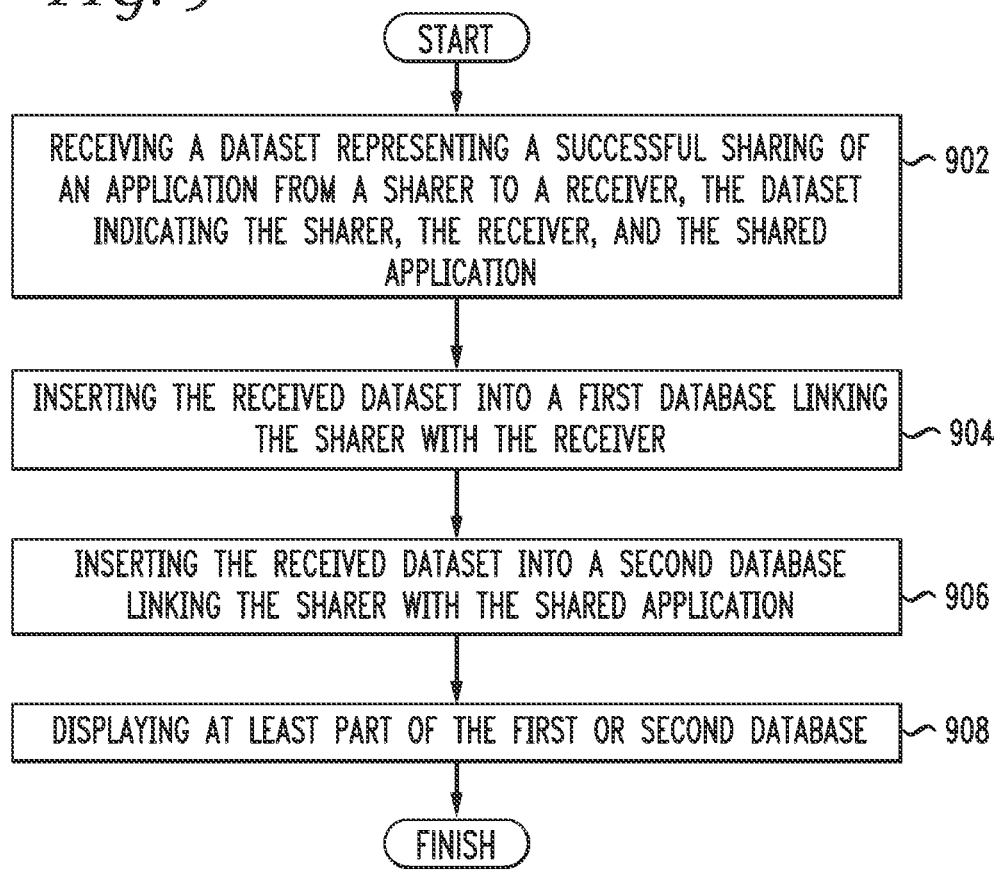
FIG. 9 illustrates a fourth example system embodiment.

The system retrieves a copy of the application from an application distribution server based on the application identifier (806). In one embodiment, a receiving, device can search for available unreceived application packages on the sharing device, request available unreceived application packages from the sharing device, and cache the requested application. packages. This is just one approach for automatic distribution of applications which can be accepted or rejected by users. In one variation, a sharing device enables the ability for receiving devices to query and automatically download application packages automatically without user interaction. This distribution approach can provide a distributed mechanism to release software. updates either as a replacement for or in conjunction with traditional software update approaches. The application package can include a limited shared copy of the application. Metadata in the application package can include a unique identifier associated with the sharing device, and, based on sharing preferences within the application, one of a limited shared copy of the application and an application seed uniquely identifying the selected application on a server. In one aspect, a server receives from the sharing device a transaction record, including an ID of the sharing device or user account associated with the device FIG. 9 illustrates a fourth example system embodiment for tracking shared applications. The system can be a computing device with a processor and modules configured to control the processor to perform certain actions. The system receives a dataset representing a successful sharing of an application from a sharer to a receiver, the dataset indicating the sharer, the receiver, and the shared application (902) and inserts the received dataset into a first database linking the sharer with the receiver (904). The system can further insert the received dataset into a second database linking the sharer with the shared application (906). The system can include a module to track how many times the sharer shares the shared application. The server can track these statistics in order to provide some kind of compensation for the sharer or for other purposes. The system can display at least part of the first or second database (908). This display can be in the form of direct information or indirect, processed, aggregated statistics. In one aspect, the system displays a tree of sharer-receiver pairs indicating descendant receivers originating at the sharer. In another aspect, the system displays a tree of sharer-receiver pairs indicating ancestor sharers originating at the receiver. A multitude of other display approaches are contemplated.

Figure 10:
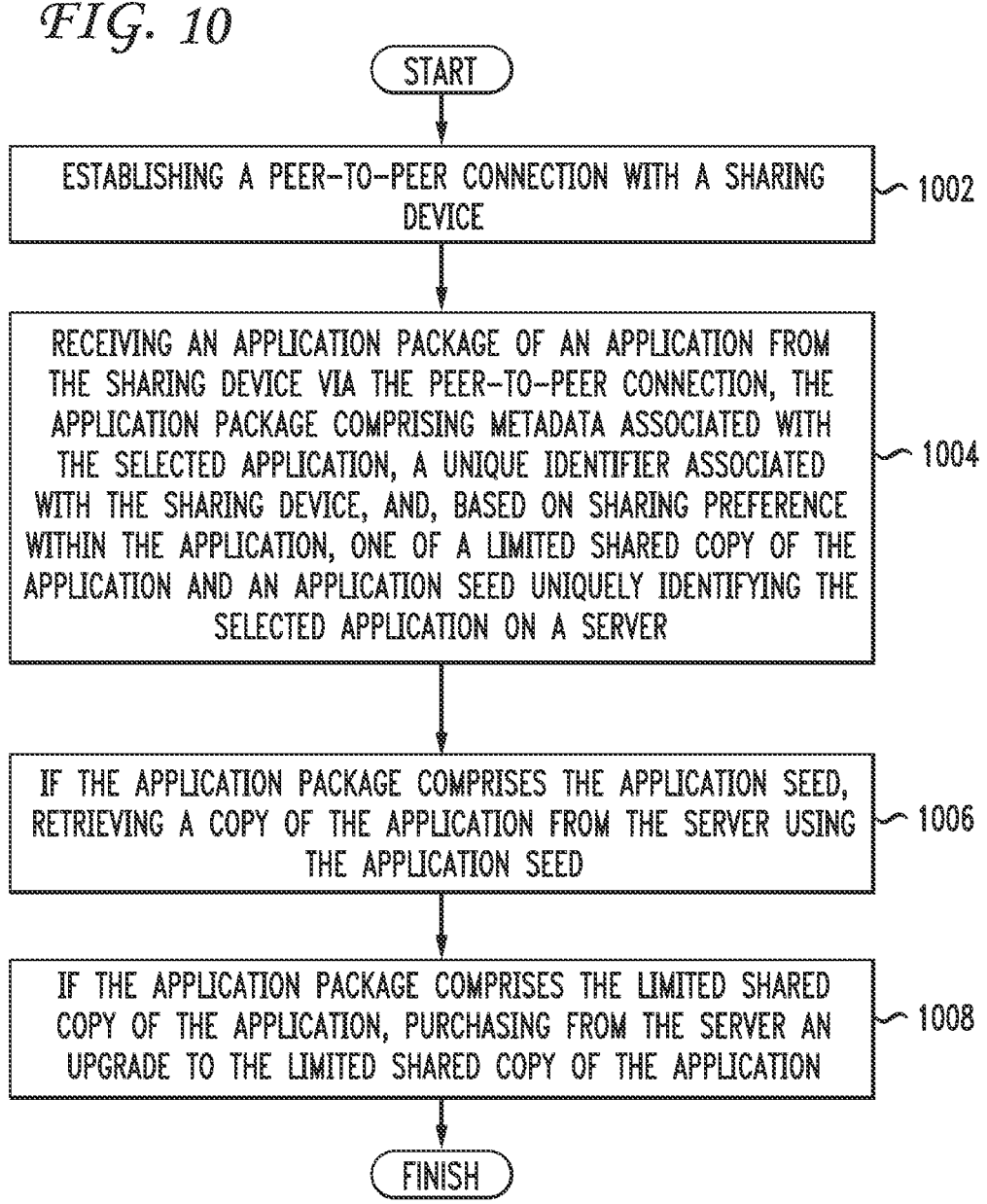
FIG. 10 illustrates a fifth example computer-readable storage medium embodiment.

FIG. 10 illustrates a fifth example tangible computer-readable storage medium embodiment having instructions for receiving an application from another device. The medium embodiment is discussed in terms of a computer system acting according to the instructions. The system first establishes a peer-to-peer connection with a sharing device (1002). The system can establish the peer-to-peer connection with multiple receiving devices simultaneously. The system then receives an application package of an application from the sharing device via the peer-to-peer connection, the application package including metadata associated with a selected application, a unique identifier associated with the sharing device, and, based on sharing preferences within the application, one of a full copy of the application, a limited shared copy of the application, or an application seed uniquely identifying the selected application on a server (1004). The application package can also include an icon representing the selected application.

Then, if the application package includes the application seed, the system retrieves a copy of the application from the server using the application seed (1006). If the application package includes the limited shared copy of the application, the system can retrieve from the server an upgrade to the limited shared copy of the application (1008). When the system receives the application package, the system can transmit an acknowledgment to the sharing device that the application package transmitted successfully.

In one embodiment, the receiving device integrates tightly with a server operating an online store. The receiving device can permit a user to easily retrieve applications from the online store based on the application seed, such as with a single click, gesture, or command. In cases where the user has a full copy of the application on the receiving device, the user can retrieve additional goods and/or services associated with the application based on the application seed. For instance, Brent received a full copy of the calculator from Aaron. If Brent so desires, he can retrieve technical support, future upgrades, skins, plug-in modules, and so forth for the full version of the application, even though he already has the complete version of the application. Additional content or services, available through an online store, can complement a full version of an application. The online store can serve as a single broker between multiple software publishers and the user.

Figure 11:
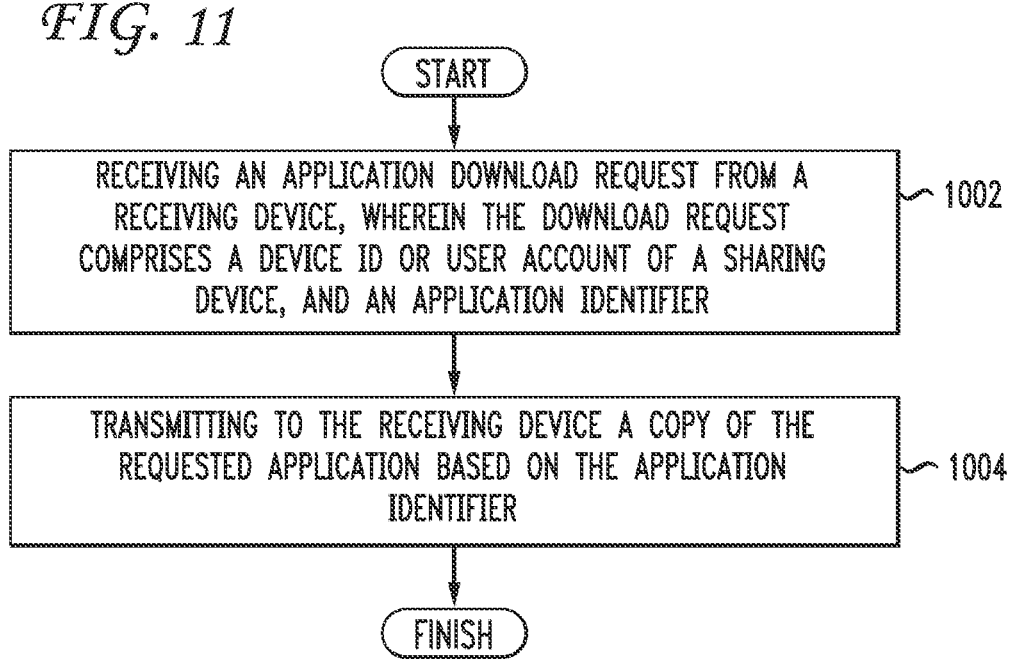
FIG. 11 illustrates a sixth example method embodiment.

FIG. 11 illustrates a sixth example method embodiment. As before, the method is discussed in terms of a system, such as that shown in FIG. 1, configured to practice the method. The system first receives an application download request from a receiving device, wherein the download request comprises a device ID or user account of a sharing device, and an application identifier (1102). The system then transmits to the receiving device a copy of the requested application based on the application identifier (1104). The system can further provide a reward to the device ID or user account of the sharing device, such as public recognition, an account credit, a cash credit, free downloads of applications or media, additional functionality of existing applications, etc. The download request can include share criteria, and the system can transmit the copy of the requested application based on the share criteria. An application developer can establish the share criteria for his or her applications. In some cases, the share criteria is a flag indicating full functionality, limited functionality, a limited number of activations, and/or an expiration date. The share criteria can be separate from or incorporated with the application package. A distribution server can even store share criteria for security, verification, or other purposes.

In one embodiment, the system provides a user interface for the sharing device that shows the number of applications shared with other users. A user can look up how many applications she has shared with others and now many application credits she has earned when receiving devices download the application. For example, the interface can display Apps Shared: 10, and Apps Credited: 5. This user interface can present options to drill down into additional listing details, such as the application names, the date shared, with whom the application was shared, the price paid (if any), etc. The system can store these statistics and usage history on a server or on the sharing device. In one variation, the sharing device can determine those applications with high sharing totals, indicating that they are commonly shared with others, and prioritize or optimize the display for easy access to share with others. The sharing device can query an application distribution server to obtain a current status of shared applications.

Embodiments within the scope of the present disclosure can also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure can be practiced in network computing environments with many types of computer system configurations, including personal computers, hand-held devices, multi-processor systems, microprocessor-based or programmable consumer electronics, network PCs, minicomputers, mainframe computers, and the like. Embodiments can also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various embodiments described above are provided by way of illustration only and should not be construed to limit the disclosure. For example, the principles disclosed herein are applicable to online stores selling electronic media, software applications, services, and any combination thereof. As new technologies emerge, those of skill in the art will appreciate how to easily modify the principles herein to accommodate the differences and additional features of new categories of items in electronic stores. Those skilled in the art will readily recognize various modifications and changes that can be made to the present disclosure without following the example embodiments and applications illustrated and described herein, and without departing from the spirit and scope of the present disclosure.

I claim:

1. A computer-implemented method for sharing an application between a sharing device and a receiving device, the method comprising:

displaying, on the sharing device, a list of one or more applications that are available to share with other devices;

receiving a selection, at the sharing device, of an application to share with the receiving device from the list of one or more applications;

creating an application package at sharing device based on sharing preferences associated with the selected application, wherein the application package comprises metadata associated with the selected application;

transmitting the application package from the sharing device to the receiving device;

providing a dataset to a first database in a remote server, the dataset comprising:
 a sharer information, a receiver information, and an application information, the first database linking the sharing device with the receiving device;
 inserting the dataset into a second database linking the sharing device with the shared application; and
 displaying, at the sharing device, at least a portion of the first database or the second database, wherein at least one of the first database and the second database comprises an aggregated statistical transaction record including a tree of sharer-receiver pairs indicating descendant receiving devices originating at the sharing device and ancestor sharing devices originating at the receiving device.

2. The method of claim 1, wherein the application package comprises metadata including at least one of a full copy of the selected application, a limited copy of the selected application, or an application seed.

3. The method of claim 2, wherein the application seed uniquely identifies the selected application on the remote server, and the receiving device can retrieve a copy of the application from the remote server based on the application package.

4. The method of claim 1, wherein the transaction record includes an application ID for the selected application.

5. The method of claim 4, wherein the transaction record includes at least one of a user account id for the sharing device and a user account id for the receiving device.

6. The method of claim 1, wherein the transaction record includes information related to the total number of application packages transmitted from the sharing device.

7. The method of claim 1, the method further comprising receiving at the sharing device an acknowledgment from the receiving device that the application package transmitted successfully.

8. The method of claim 1, the method further comprising transmitting the transaction record from the sharing device to the receiving device.

9. The method of claim 1, the method further comprising storing the transaction record in a storage area on the sharing device.

10. The method of claim 1, the method further comprising receiving by the sharing device a device identifier for the receiving device.

11. The method of claim 1, wherein the application package comprises an application seed ID and a graphic image representing the selected application.

12. A non-transitory computer-readable medium storing instructions that, when executed by a sharing device, cause the sharing device to perform a method, the method comprising:
 displaying, on a sharing device, a list of one or more applications that are available to share with other devices;
 receiving a selection, at the sharing device, of an application to share with a receiving device from the list of one or more applications;
 creating an application package at sharing device based on sharing preferences associated with the selected application, wherein the application package comprises metadata associated with the selected application;
 transmitting the application package from the sharing device to the receiving device;
 providing a dataset to a first database in a remote server, the dataset comprising:
  a sharer information, a receiver information, and an application information, the first database linking the sharing device with the receiving device;
 inserting the dataset into a second database linking the sharing device with the shared application; and
 displaying, at the sharing device, at least a portion of the first database or the second database, wherein at least one of the first database and the second database comprises an aggregated statistical transaction record including a tree of sharer-receiver pairs indicating descendant receiving devices originating at the sharing device and ancestor sharing devices originating at the receiving device.

13. The non-transitory computer-readable medium of claim 12, wherein the application package comprises metadata including at least one of a full copy of the selected application, a limited copy of the selected application, or an application seed.

14. The non-transitory computer-readable medium of claim 13, wherein the application seed uniquely identifies the selected application on the remote server, and the receiving device can retrieve a copy of the application from the remote server based on the application package.

15. The non-transitory computer-readable medium of claim 12, wherein the transaction record includes an application identification for the selected application.

16. The non-transitory computer-readable medium of claim 15, wherein the transaction record includes at least one of a user account id for the sharing device and a user account id for the receiving device.

17. The non-transitory computer-readable medium of claim 12, wherein the transaction record includes information related to the total number of application packages transmitted from the sharing device.

18. The non-transitory computer-readable medium of claim 12, wherein the method further comprises receiving at the sharing device an acknowledgment from the receiving device that the application package transmitted successfully.

19. The non-transitory computer-readable medium of claim 12, wherein the method further comprises transmitting the transaction record from the sharing device to the receiving device.

20. The non-transitory computer-readable medium of claim 12, wherein the method further comprises storing the transaction record in a storage area on the sharing device.

21. The non-transitory computer-readable medium of claim 12, wherein the method further comprises receiving by the sharing device a device identifier for the receiving device.

22. A system for sharing an application, the system comprising:
 a sharing device, configured to:
 display a list of one or more applications that are available to share with other devices, receiving a selection of an application to share with another device from the list of applications, create an application package based on sharing preferences associated with the selected application comprising metadata associated with the selected application, transmit the application package to another device via a network connection,
 provide a dataset to a first database in a remote server, the dataset comprising a sharer information, a receiver information, and an application information;
 insert the dataset into a second database linking the sharing device with the shared application; and
 display, at the sharing device, at least a portion of the first database or the second database, wherein at least one of the first database and the second database comprises an aggregated statistical transaction record including a tree of sharer-receiver pairs indicating descendant receiving devices originating at the sharing device and ancestor sharing devices originating at the receiving device; and a receiving device, the receiving device configured to:
receive the application package via the network connection, and responsive to receiving the application package installing a full copy of the selected application or a limited copy of the selected application; and a remote server, the remote server configured to:
receive the aggregated statistical transaction record from the sharing device.

* * * * *

UNITED STATES PATENT AND TRADEMARK OFFICE
CERTIFICATE OF CORRECTION

| | | |
|---|---|---|
| PATENT NO. | : 8,732,238 B2 | Page 1 of 1 |
| APPLICATION NO. | : 13/692403 | |
| DATED | : May 20, 2014 | |
| INVENTOR(S) | : Edward D. Steakley et al. | |

It is certified that error appears in the above-identified patent and that said Letters Patent is hereby corrected as shown below:

In the Claims:

Column 14, line 62 (Claim 1, line 10): "at sharing" should read --at the sharing--.

Column 15, line 7 (Claim 1, line 22): "the shared application;" should read --the selected application;--.

Column 15, line 58 (Claim 12, line 10): "at sharing" should read --at the sharing--.

Column 16, line 5 (Claim 12, line 22): "the shared application;" should read --the selected application;--.

Column 16, line 64 (Claim 22, line 16): "the shared application;" should read --the selected application;--.

Column 17, line 7 (Claim 22, line 26): "package" should read --package,--.

Column 17, line 9 (Claim 22, line 28): "application;" should read --application,--.

Signed and Sealed this
Thirtieth Day of September, 2014

Michelle K. Lee
*Deputy Director of the United States Patent and Trademark Office*